United States Patent [19]

Consoli

[11] 3,909,488

[45] Sept. 30, 1975

[54] VINYL PLASTISOL COMPOSITIONS

[75] Inventor: Sebastian A. Consoli, Lawrence, Mass.

[73] Assignee: Tillotson Corporation, Needham, Mass.

[22] Filed: Mar. 6, 1974

[21] Appl. No.: 448,718

[52] U.S. Cl. .... 260/42.49; 106/308 F; 260/30.6 R; 260/31.2 R; 260/31.6; 260/31.8 R; 260/31.8 G; 260/33.8 UA; 260/34.2; 260/42.57; 260/45.75 R

[51] Int. Cl.$^2$.................... C08K 5/11; C08J 3/20

[58] Field of Search......... 260/42.49, 42.57, 31.2 R, 260/31.8 R, 31.8 G, 34.2; 106/308 F

[56] References Cited
UNITED STATES PATENTS

| | | | |
|---|---|---|---|
| 2,777,008 | 1/1957 | Kern et al. | 260/42.57 |
| 2,980,643 | 4/1961 | Edelman et al. | 260/42.49 |
| 3,043,708 | 7/1962 | Watson et al. | 106/308 F |
| 3,338,852 | 8/1967 | Reventas et al. | 260/42.49 |
| 3,502,611 | 3/1970 | Palmer et al. | 260/42.49 |
| 3,523,916 | 8/1970 | Needham et al. | 260/42.57 |

*Primary Examiner*—James H. Derrington
*Attorney, Agent, or Firm*—Kenway & Jenney

[57] ABSTRACT

Filled vinyl polymer plastisols are provided containing high concentrations of a filler, i.e. up to about 1500 weight percent based upon the weight of the vinyl polymer. The plastisols are prepared by first mixing a lubricant such as butyl stearate with a powdered unplasticized vinyl polymer and the filler and thereafter adding a plasticizer for the vinyl polymer.

12 Claims, No Drawings

VINYL PLASTISOL COMPOSITIONS

BACKGROUND OF THE INVENTION

This invention relates to vinyl polymer compositions containing high concentrations of fillers and to the method for forming the same.

Prior to the present invention, filled vinyl plastisol compositions have been well known in the art. Generally, these compositions are formed by adding a particulate filler to a vinyl plastisol comprising a vinyl polymer and a plasticizer for the vinyl polymer and intimately admixing the components to form the desired final composition. The fillers are added to the vinyl plastisol in order to regulate or change the physical characteristics thereof. In some instances, fillers are added to improve the durability characteristics of the vinyl composition. In other instances, the fillers are added to change a specific characteristic of the vinyl composition such as by improving flame resistance of the vinyl composition. In any event, prior to the present invention, the change in these physical characteristics that can be afforded by adding the filler to the vinyl composition has been limited since the concentration of filler that can be added is severely limited. Generally, at the present time, fillers can be added to vinyl plastisol compositions in amounts only up to about 200 weight percent based upon the vinyl polymer. When the filler is added in concentrations exceeding this concentration, the resultant composition is non-uniform and the particulate filler will become separated from the cured composition during normal use. Obviously, this is undesirable since it generally results in a reduction of the strength characteristics of the resultant vinyl composition.

It would be highly desirable to provide a means for introducing increased concentrations of fillers into vinyl plastisol compositions without seriously reducing the strength characteristics of the final composition to provide greater flexiblity in the characteristics that can be obtained for vinyl plastisol compositions. In one aspect, it would be highly desirable to provide a means for introducing increased concentrations of fillers that provide flameproofing properties to vinyl plastisol compositions for use, as for example, on the underside of carpets.

SUMMARY OF THE INVENTION

The present invention provides a process for forming vinyl compositions containing high concentrations of fillers, e.g. in the order of up to about 2500 weight percent based upon the vinyl polymer. The present invention is based upon the discovery that when a lubricant composition, and a filler are added to a powdered, unplasticized, vinyl polymer composition prior to adding a plasticizer to the vinyl polymer composition addition of particulate fillers in very high concentrations can be obtained. Subsequent to the addition of the lubricant, and filler, a plasticizer can be added to the vinyl polymer composition and the components are intimately admixed to form a filled vinyl plastisol composition.

DESCRIPTION OF SPECIFIC EMBODIMENTS

The lubricant is added as a liquid to the powdered vinyl polymer and filler and is admixed therewith in order to coat the polymer particles and filler particle with the non-solvating liquid. It is believed that the lubricant coats the polymer particles as a non-solvating film which greatly affects and reduces the rate at which the plasticizer subsequently added thereto solvates the vinyl polymer. The powdered vinyl polymer lubricant and filler are intimately admixed for a period of time sufficient to obtain a homogeneous mixture of the components. The plasticizer then is added to the polymer-lubricant-filler mixture and homogeneously admixed therewith either sequentially or together. The presence of the lubricant film on the vinyl polymer particles increases the time necessary for the plasticizer to solvate the polymer thereby providing additional time to promote homogeneous admixture of the filler particles into the final composition. This additional time also permits more complete and more dispersed distribution of the filler into the vinyl composition thereby preventing or substantially reducing subsequent separation of the filler from the vinyl polymer during ultimate use thereof. After the components have been admixed in the desired proportions, the composition can be heated, generally in the range of between about 300°, and 400°F, in order to effect fusion of the vinyl composition.

The compositions of this invention are useful in a wide variety of applications. Thus, for example, the filler can comprise hydrated aluminum oxide which can be incorporated as a flame retardant in the vinyl composition and the resultant composition can be employed as a coating on the underside of a tufted carpet to improve drape and handling thereof and to improve its resistance to flammability. In another application, the compositions of this invention can be employed to form tile such as wall tile used for noise abatement.

Suitable lubricants that can be employed in the compositions of this invention are those which are capable of coating the vinyl polymer particles without significant solvation thereof and which promote homogeneous dispersion of filler particles added to the polymer-lubricant compositions. The lower alkyl fatty acid esters are suitable as lubricant compositions in the present invention. The preferred lubricant is butyl stearate. The lubricant is added at a concentration to effect substantially complete coating of the vinyl polymer particles but not in such high amounts as to effect lubricant exudation from the vinyl cured vinyl polymer composition. Surprisingly, other materials normally used as lubricants such as castor oil, mineral oil, ethylene glycol and glycerine do not permit the addition of larger amounts of filler in accordance with this invention. Generally, the lubricant can be employed in amounts of between about 5 and about 15 weight percent based upon the weight of the filler preferably between about 8 and about 12 weight percent.

Suitable resins can be employed in the present invention are those which can be solvated by a plasticizer and which can be coated with the lubricant such as polyvinyl chloride, polyvinyl acetate, vinyl chloride-vinyl acetate copolymers, polyvinylidene chloride, or the like.

The plasticizer can be employed alone or can be diluted with a suitable solvent for the plasticizer such as mineral oil which does not degrade the polymer. Exemplary suitable plasticizers include adipic acid esters, such as diethyl adipate, di-n-hexyl adipate; glycol derivatives such as diethylene glycol dipelargonate, triethylene glycol dipelargonate; chlorinated paraffins; phosphoric acid derivatives such as tri-(2-ethyl-hexyl) phosphate, tributoxyethyl phosphate, triphenyl phosphate, cresyl diphenyl phosphate, tricresyl phosphate, and the like; phthalic acid derivatives such as dimethyl phthalate, dibutyl phthalate, dioctyl phthalate, butyl cyclohexyl phthalate, or the like; sebacic acid derivatives such as dimethyl sebacate, dibutyl sebacate, diisooctyl sebacate, or the like. The plasticizer is employed in the same concentration range as the lubricant as set forth above. Preferably, the lubricant and plasticizer are employed in about equal parts by weight.

The vinyl polymer composition also can contain the usual resin additive such as fillers, dyes, pigments, heat stabilizers, light stabilizers etc. The vinyl polymer, prior to plasticizer addition, also can contain a plasticizer but only in low concentration such that the resin composition remains in the form of a freely flowing powder.

Representative suitable fillers include particulate calcium carbonate, carbon black, diatomaceous earth, silica, alumina, mica, barium sulfate, glass, titanium dioxide, iron oxides, or the like. The compositions of this invention contain fillers in concentrations above about 300 weight percent and up to about 2500 weight percent, based upon the weight of the vinyl polymer.

The following examples illustrate the present invention and are not intended to limit the same.

EXAMPLE 1

The composition shown in Table I was prepared as follows:

|  | Wt % (PVC) | Lbs. |
| --- | --- | --- |
| Polyvinylchloride | 100.0 | 10.290 |
| Aluminum Oxide Decahydrate | 250.0 | 25.725 |
| Barium Sulfate | 1000.0 | 102.900 |
| Butyl Stearate | 100.0 | 10.290 |
| Dioctyl Phthalate | 100.0 | 10.290 |
| Yellow Pigment 25 Wt. % in Dioctyl Phthalate | 3.0 | .309 |
| Red Pigment | 0.5 | .061 |

The polyvinylchloride aluminum oxide decahydrate, barium sulfate and butyl stearate were admixed in a Ribbon Blender for fifteen minutes at a speed of about 300 r.p.m. until the composition appeared homogeneous. Therafter, the dioctyl phthalate was added slowly over a period of time of about 3 minutes while the mixture was being agitated. After the plasticizer had been added, the mixing was maintained for about an additional 15 minutes until the resultant composition appeared homogeneous. Thereafter, the yellow and red pigment compositions were added to the homogeneous mixture and mixed for about 10 minutes.

The homogeneous mixture then was spread on a filter glass belt which was passed through an oven at about 300°F for about fifteen minutes to produce tiles having a thickness of about ⅛ inch.

The procedure set forth in this example was repeated in separate runs employing as a lubricant castor oil, mineral oil, ethylene glycol or glycerine rather than butyl stearate. The remaining components of the composition are as set forth in Table I. When employing these lubricants, in no instance was it possible to retain the filler homogeneously within the composition and in each instance the composition obtained was unsatisfactory.

I claim:

1. A vinyl plastisol composition comprising a vinyl polymer, a lower alkyl ester of a fatty acid in an amount sufficient to coat said polymer when in powder form, a plasticizer for said polymer and a particulate filler in an amount of between about 300 and 2500 weight percent based upon the weight of said polymer, the concentration of the ester being between about 5 to 15 weight percent, based upon the weight of filler, said ester being added to a mixture of said polymer and filler prior to adding said plasticizer to said polymer thereby to greatly reduce the rate at which the plasticizer subsequently added to said mixture solvates the vinyl polymer and thereby to effect homogeneous dispersion and retention of said filler in the vinyl plastisol composition.

2. The composition of claim 1 wherein said polymer is polyvinyl chloride.

3. The composition of claim 1 wherein said ester is butyl stearate.

4. The composition of claim 2 wherein said ester is butyl stearate.

5. The composition of claim 1 wherein said filler is a fire retardant.

6. The composition of claim 2 wherein said filler is a fire retardant.

7. The composition of claim 3 wherein said filler is a fire retardant.

8. The composition of claim 4 wherein said filler is a fire retardant.

9. The process of forming a vinyl plastisol composition containing between about 300 and 2500 weight percent filler based upon the weight of vinyl polymer in the plastisol which comprises mixing a powdered vinyl polymer and a particulate filler with a lower alkyl ester of a fatty acid in an amount sufficient to coat said vinyl powder, said ester comprising between about 5 and 15 weight percent based upon the weight of filler and thereafter admixing a plasticizer for said polymer with said polymer-ester-filler mixture.

10. The process of claim 9 wherein said polymer is polyvinyl chloride.

11. The process of claim 9 wherein said ester is butyl stearate.

12. The process of claim 10 wherein said ester is butyl stearate.

* * * * *